United States Patent [19]

Murray et al.

[11] Patent Number: 5,538,261
[45] Date of Patent: Jul. 23, 1996

[54] MECHANICAL HEAT-EXCHANGE TUBE SEALING SYSTEM

[75] Inventors: Wallace G. Murray, Monroe, La.; Janek Porowski, Pittsburgh, Pa.

[73] Assignee: Columbian Chemicals Company, Atlanta, Ga.

[21] Appl. No.: 284,814

[22] Filed: Aug. 2, 1994

[51] Int. Cl.[6] ............................................. F16J 15/18
[52] U.S. Cl. ....................... 277/105; 277/123; 277/64; 277/236; 285/137.1; 285/212; 285/348; 285/351; 285/917; 165/173
[58] Field of Search ..................... 165/76, 173, 178; 277/236, 58, 60, 64, 123, 125, 105, 112; 285/137.1, 211, 212, 348, 351, 917

[56] References Cited

U.S. PATENT DOCUMENTS

| | | | |
|---|---|---|---|
| 2,853,321 | 9/1958 | Davey | 277/64 |
| 2,993,713 | 7/1961 | Krueger | 286/30 |
| 3,279,532 | 10/1966 | Pfeil, Jr. | 165/81 |
| 3,348,850 | 10/1967 | Scales | 277/101 |
| 3,436,085 | 4/1969 | Polk | 277/165 |
| 3,923,314 | 12/1975 | Lawler et al. | 277/112 |
| 4,114,907 | 9/1978 | Abbes et al. | 285/917 |
| 4,218,067 | 8/1980 | Halling | 277/236 |
| 4,328,974 | 5/1982 | White et al. | 277/122 |
| 4,384,726 | 5/1983 | Meyer | 277/59 |
| 4,421,325 | 12/1983 | Napolitano . | |
| 4,452,462 | 6/1984 | Karr, Jr. . | |
| 4,470,607 | 9/1984 | Schier et al. | 277/117 |
| 4,477,087 | 10/1984 | Sutter et al. | 277/236 |
| 4,540,184 | 9/1985 | Takahashi et al. | 277/1 |
| 4,561,662 | 12/1985 | de Villepoix et al. | 277/236 |
| 4,577,873 | 3/1986 | Baumann | 277/123 |
| 4,640,305 | 2/1987 | Johnson | 277/105 |
| 4,651,815 | 3/1987 | Logic et al. | 165/173 |
| 4,702,310 | 10/1987 | McDonough | 165/158 |
| 4,709,933 | 12/1987 | Adamek et al. . | |
| 5,380,019 | 1/1995 | Hillery et al. . | |

FOREIGN PATENT DOCUMENTS

| | | | |
|---|---|---|---|
| 210570 | 6/1984 | Germany | 165/76 |
| 7505659 | 11/1976 | Netherlands . | |
| 2064023 | 6/1981 | United Kingdom . | |
| 2263951 | 8/1993 | United Kingdom . | |

Primary Examiner—Scott W. Cummings
Attorney, Agent, or Firm—Pravel, Hewitt, Kimball & Krieger

[57] ABSTRACT

A sealing system for heat exchangers of the type having a plurality of vertically positioned heat tubes extending through a heat tube sheet for exchanging heat between the interior of the plurality of heat tubes to the surrounding atmosphere, the sealing system including a first outer ring having a wall portion, terminating in an upper face, and defining an annular space between the lower end portion of the outer ring and the heat tube and tube sheet; a high nickel metal inner ring, positioned within the annular space surrounding the heat tube and resting on the tube sheet; a soft metal casing partially housing the high nickel inner ring so that when force is applied downward on the first outer ring, the annular space is reduced sufficiently to force the high nickel ring and the soft metal casing into a sealing relationship between the heat tube and the tube sheet, while allowing for vertical movement of the heat tube; the outer ring further defining a means to prevent the high nickel ring and the soft metal casing to be crushed by the downwardly applied force; and a pressure collar surrounding the sealing system for applying the force to effect the seal between the heat tube and tube sheet. There is further provided a secondary seal of packing material positioned between the first outer ring and the wall of the heat tube.

20 Claims, 3 Drawing Sheets

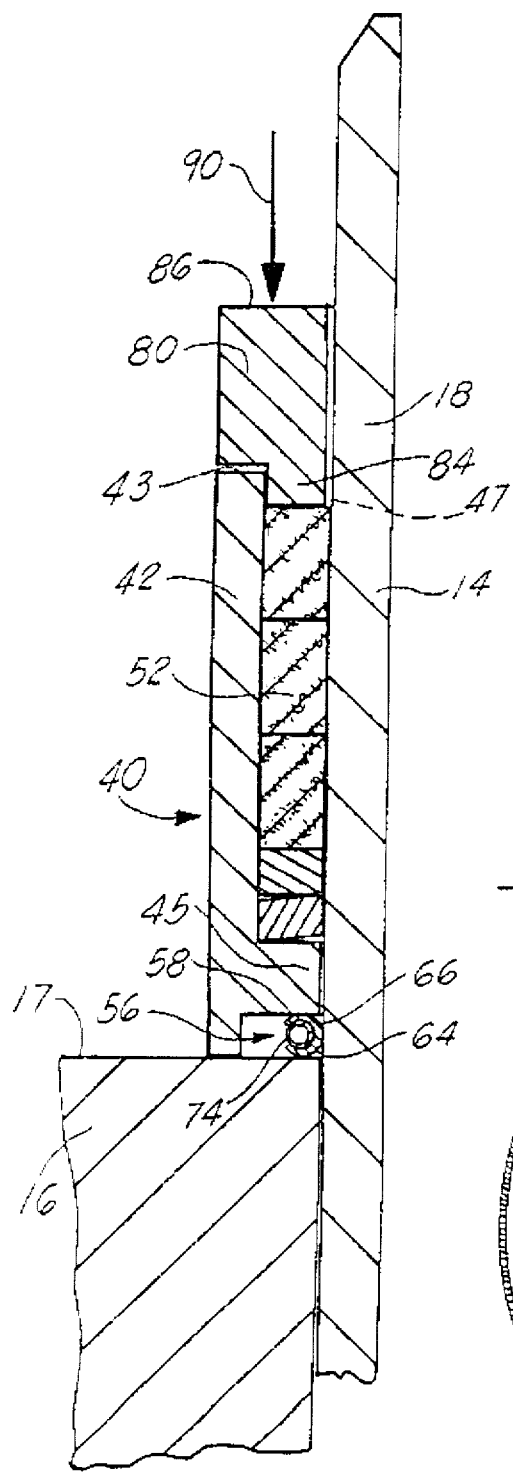
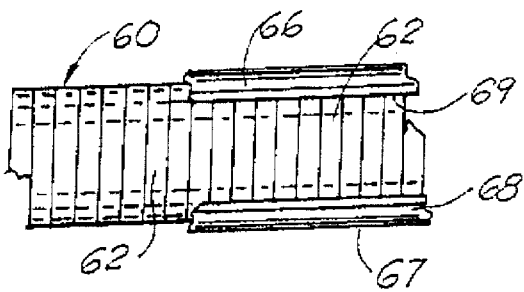
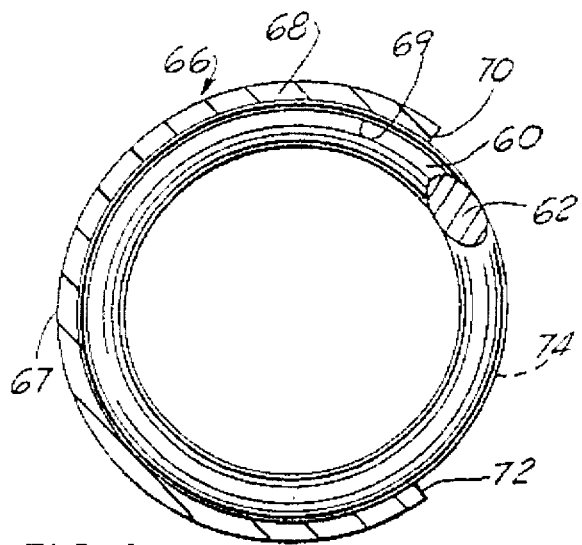
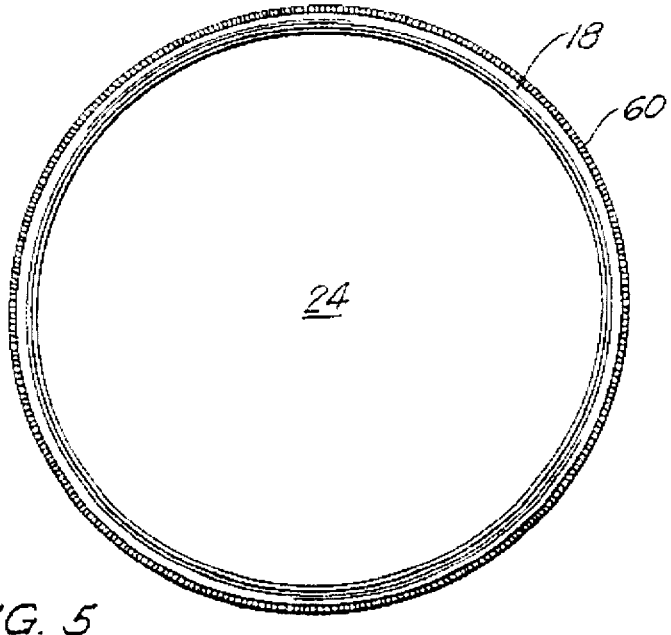
FIG. 2
FIG. 4
FIG. 3
FIG. 5

5,538,261

MECHANICAL HEAT-EXCHANGE TUBE SEALING SYSTEM

BACKGROUND OF THE INVENTION

1. Field of the Invention

The present invention relates to seals for heat exchangers. More particularly, the present invention relates to a mechanical tube seal system for a high temperature Air/Carbon Black laden process gas heat exchanger which utilizes a spring tensioned soft metal primary ring partially contained within a housing, the ring and housing together providing for sealing during expansion of the heat exchange tubes during the application of high heat to the tube during the process.

2. General Background

In the current state of the art, high temperature (HT) heat exchangers which are utilized in various industries require a very high cost of fabrication in order to provide for the expansion of the heat exchanger tubes during operation, yet continue to seal around the tubes. In the art, the individual heat exchange tubes provide for individual tube convoluted expansion joints which attribute to the high cost. Due to the rather complex fabrication involved, the heat exchange tube mechanisms result in a rather large, therefore rather expensive system, and in order to be properly supported, the support system must be quite extensive.

A typical heat exchanger would normally include a plurality of spaced apart, parallel tubes extending between opposing metal tube sheets. During the operation of the system, heat transfer would occur between the material inside the parallel tubes, and the material on the outside of the tubes, since in many applications, it would be disadvantageous to have the material on the inside of the tubes commingle with the material on the exterior. For this reason, it is imperative that there be a very tight seal between each of the tubes and the metal tube sheets. Furthermore, since the temperatures in the parallel tubes reach high levels, it is necessary to allow the tubes to undergo expansion and subsequent contraction without rupturing the mechanical seals between the parallel tubes and the tube sheets.

In the present state of the art, each of the tubes would be welded at a first end to one of the tube sheets and would be engaged to the second tube sheet with bellowed alloy steel convolutes which serve as expansion joints to allow the expansion and contraction of the tubes relative to the sheets. These so-called expansion joints are then welded to the tubes and the tube sheets. Although such conventional expansion joints are effective, they are relatively large in size, and increase the overall size and cost of the heat exchanger system. Furthermore, they tend to decrease the transfer efficiency of heat from the tubes.

Several patents were found in a search of the art which are pertinent to the present invention. These are cited in the accompanying prior art statement, being submitted herewith.

SUMMARY OF THE PRESENT INVENTION

The system of the present invention solves the problems confronted in the art in a simple and straightforward manner. What is provided is a system for sealing heat tubes in heat exchangers of the type having a plurality of vertically positioned heat tubes extending through a heat tube sheet for exchanging heat between the interior of the plurality of heat tubes to the surrounding area, the sealing system including a first outer sleeve having a wall portion, terminating in an upper face, and defining an annular space between the lower end portion of the outer ring and the heat tube and tube sheet; a soft metal inner ring, positioned within the annular space surrounding the heat tube and supported by the tube sheet; a casing partially housing the soft metal inner ring so that when force is applied downward on the first outer sleeve, the annular space is reduced sufficiently to force the soft metal ring and the casing into a sealing relationship between the heat tube and the tube sheet, but allowing vertical expansion of the heat tube, with the outer sleeve further defining a means to prevent the soft metal ring and the casing to be crushed by the downwardly applied force; and a pressure collar surrounding the sealing system for applying the force to effect the seal between the heat tube and tube sheet. There is further provided a secondary seal of packing material positioned between the first outer ring and the wall of the heat tube.

Therefore, it is a principal object of the present invention to provide a sealing system for heat exchangers which is less expensive and more compact than conventional sealing arrangements;

It is a further principal object of the present invention to provide a sealing system between a heat tube and the tube sheet of a heat exchanger by effecting a first primary seal at the juncture of the tube and tube sheet and a secondary seal between the wall of the heat tube and the sealing member.

It is a further object of the present invention to provide a seal between a heat tube and tube sheet of a heat exchanger wherein the primary sealing is established by a sealing ring which allows vertical expansion and contraction of the heat tube while maintaining the seal.

It is a further object of the present invention to provide a system for sealing between a heat tube and a tube sheet of a conventional heat exchanger whereby an inner compressible ring forms a primary seal and a graphite packing forms a secondary seal in the system.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 2 illustrates a partial cutaway view of the sealing system in the preferred embodiment of the present invention;

FIG. 3 illustrates a side partial cutaway view of the primary sealing ring utilized in the preferred embodiment of the present invention;

FIG. 4 illustrates a partial isolated view of the configuration of the primary sealing ring utilized in the preferred embodiment of the present invention; and FIG. 5 illustrates a top view of the sealing rings utilized in the preferred embodiment of the present invention.

DETAILED DESCRIPTION OF THE PREFERRED EMBODIMENT

Figure 1:
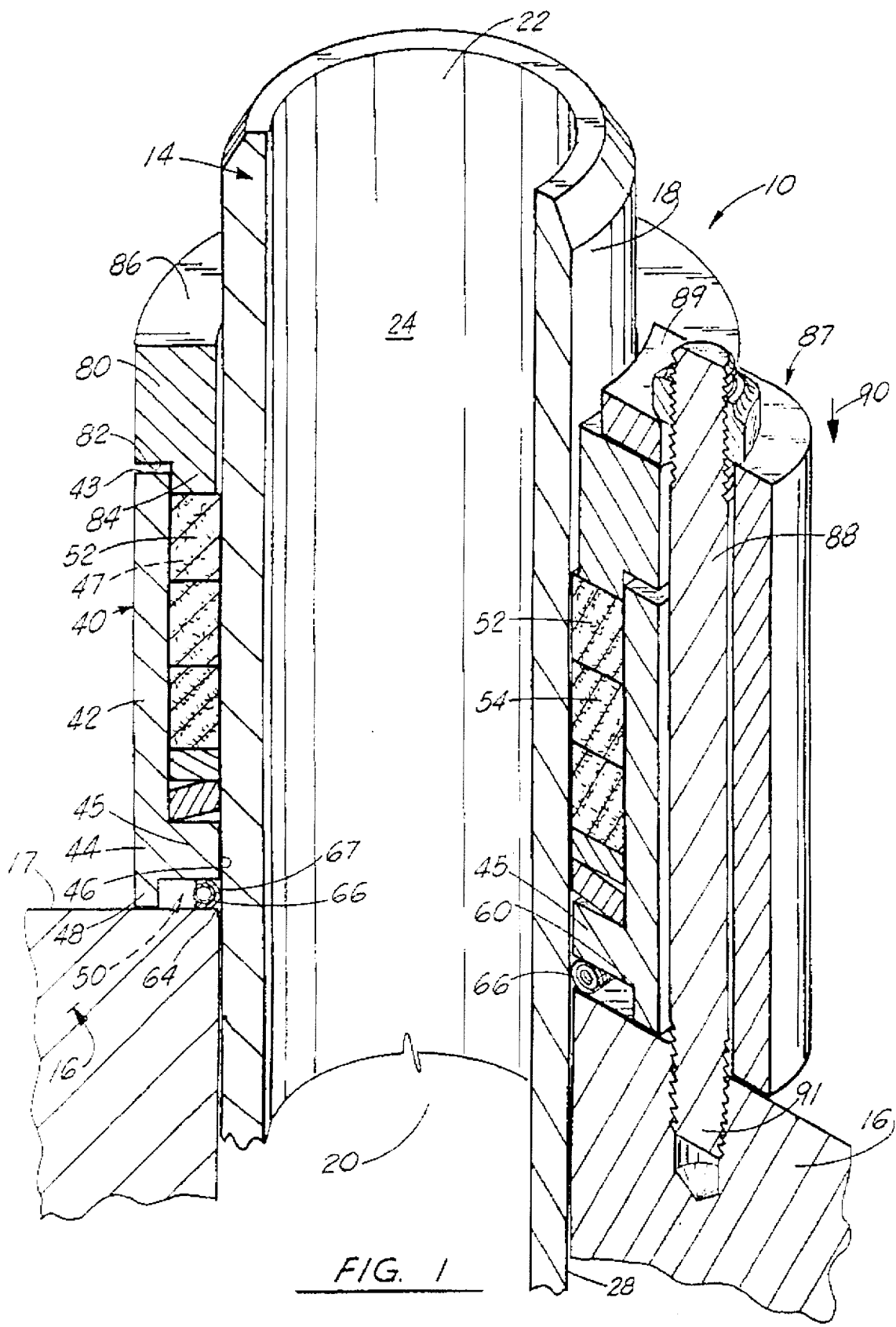
FIG. 1 illustrates an overall cutaway view of the sealing system in the preferred embodiment of the present invention.
Figure 6:
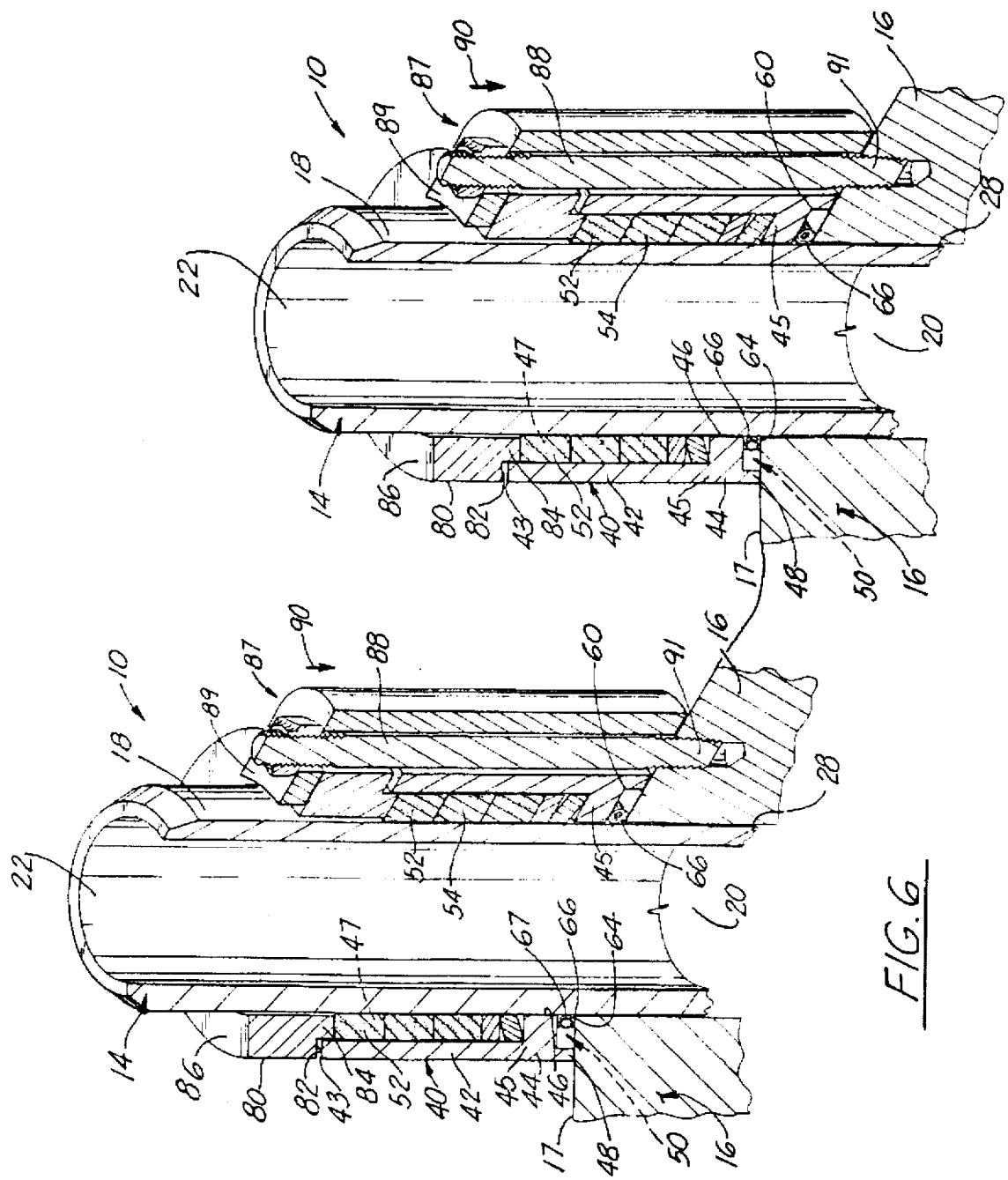
FIG. 6 illustrates an overall cutaway view of a plurality heat tubes with a plurality of sealing systems.

FIGS. 1 through 5 illustrate the preferred embodiment of the sealing system of the present invention illustrated by the numeral 10. As seen in overall view in FIG. 1, sealing system 10 provides a means for forming an effective seal between a heat tube 14 and a tube sheet 16, of the type typically found in conventional heat exchangers. As illustrated heat tube 14 would comprise a generally continuous annular wall portion 18 having a lower end opening 20 and an upper end opening 22, and defining an internal space 24 through which materials would flow in order to allow the materials flowing in tube 14 to exchange some of their heat through the wall 18 of heat tube 14 to the area 28 below the tube sheet 16. As seen in FIG. 1, there is illustrated a single heat tube 14, but in reality, a conventional heat exchanger would comprise a plurality of heat tubes 14, each functioning identical to the other. FIG. 6 illustrates such a plurality of heat tubes, each functioning identical to the other.

Each of the heat tubes 14, as seen in FIG. 1, would extend through the tube sheet-layer 16. Tube sheet 16, having an upper face 17, would serve as a metal barrier between the outside area 28 surrounding heat tube 14, and the material flowing through the heat tube 14. Since, during the use of the heat exchanger, the heat tube 14 would be subject to very high temperatures, the heat tube 14 would undergo some expansion of the wall 18. Therefore, it is necessary that there be provided a means for allowing the heat tube wall 18 to expand and contract relative to the stationary tube sheet 16, yet at the same time, continue to provide a seal between the heat tube 14 and the tube sheet 16, so that material below sheet 16 does not co-mingle with material on the upper face 17 of tube sheet 16.

In order to accomplish this task, reference is made to the sealing system 10 as illustrated in the FIGURES. As seen in overall view in FIG. 1, sealing system 10 would comprise a first outer sleeve member 40, having a vertical wall portion 42 terminating in an upper face 43. The lower portion 44 of sleeve member 40 would include an inwardly projecting shoulder 45, having an inner face 46 not making contact with the outer wall 18 of heat tube seal 14. Inwardly projecting shoulder 45 would define an annular space 47 between the heat tube wall 18 and the vertical wall portion 42 of outer sleeve 40. The lower end portion 44 of outer sleeve 40 would terminate in a foot portion 48, which would rest upon the upper face 17 of tube sheet 16 and define a space 50, below shoulder 45 and between the foot portion 48 and the wall 18 of heat tube 14, the function of which will be described further.

As described earlier, the annular space 47 formed between the wall 18 of heat tube 14 and vertical wall portion 42 of outer sleeve 40 would house a quantity of secondary packing material 52, which, in the preferred embodiment, would comprise a compacted graphite material commonly used as a packing to effect a seal in metal to metal contact situations.

As seen in FIG. 2, packing material 52 would be positioned so as to form a secondary sealing means 54 between vertical wall portion 42 of outer sleeve 40 and the heat tube wall 18. This secondary sealing means 54 would prevent any leaking of material from the sealing system, should the material leak through the primary sealing means, yet to be described.

Turning now to the primary sealing means of the present invention, as noted by numeral 56, reference is made primarily to FIGS. 2 through 4. As illustrated in those Figures, primary sealing means 56 would be positioned within the space 50 formed below shoulder 45 and between the foot portion 48 of outer sleeve 40, the wall 18 of heat tube 14, and tube sheet 16. Primary sealing means 56 would comprise a resilient ring means 58, which, as seen in the Figures, would further comprise a first inner spring-tensioned primary metal ring 60, formed of continuous, tightly wound spirals 62, primary ring 60 preferably being constructed of a high-nickel steel, and defining a continuous ring surrounding the outer wall 18 of heat tube 14, within space 50 at the juncture 64 between heat tube 14 and tube sheet 16. The resilient ring means 58 would further comprise an outer metal housing 66, preferably being constructed of a soft, flexible metal, such as gold overelay, stainless steel, which would house primary ring 60, as seen in FIG. 3, with housing 66 having a sidewall 68, whose inner surface 69 contacts ring 60 partially along its length, but terminating at points 70, 72, to define an opening 74 where primary ring 60 is not contained within housing 66. As illustrated in FIG. 2, in the preferred embodiment, opening 74 is positioned outward from the wall 18 of heat tube 14, with the outer surface 67 of housing 66 making contact with both the wall 18 of heat tube 14 and the upper face 17 of tube sheet 16, at juncture 64, when in position around the wall 18 of heat tube 14.

Reference is now made to the upper ring 80 which is positioned atop the upper face 43 of outer sleeve 40 and surrounds the heat tube 14 as seen in FIG. 1. Upper ring 80 includes a first lower face 82 which rests upon the upper face 43 of vertical wall 42 of outer sleeve 40. It further provides a lower foot 84 which projects into annular space 47 and makes contact with packing material 52. Upper ring 80 fits snugly against the outer wall 18 of heat tube 14 and terminates in an upper face 86. Upper ring 80 provides the surface to which force is to be applied to the sealing system 10, in order to effect the primary and secondary seals in the system.

As seen primarily in FIG. 1, once the rings and packing material as heretofore described are in place, as illustrated primarily in FIGS. 1 and 2, there is provided a means to apply force to the system. This means comprises a pressure collar 87 positioned around the upper ring 80 and the outer sleeve 40, and resting on the upper face 17 of tube sheet 16. Pressure collar 87 would include an inward depending shoulder 89 for engaging the upper ring 80 when placed in position. Pressure collar 87 further provides a plurality of spaced apart bolt members 88 extending through the pressure collar 87 and boltingly secured at their lower ends 91 into the tube sheet 16. As each bolt 88 is tightened, the shoulder 89 of collar 87 imparts downward force, in the direction of arrow 90, to the upper ring 80 of sealing system 10. The upper ring 80 is forced downward to apply force to the packing material 52 which is compacted against the wall 18 of heat tube 14 to effect the secondary seal required. Further, the outer sleeve 40 is forced downward by the pressure, so that the space 50 housing the primary sealing means 56 is reduced, and pressure is applied to the metal housing 66 housing the primary ring 60. When this occurs, the circular cross-section of the housing 66 and spring-tensioned, soft primary ring 60 are forced to conform substantially to the right angle between the vertical wall 18 of heat tube 14 and the horizontal face 17 of tube sheet 16, at juncture 64, thus forming the primary seal in the system.

It is critical during the application of the force via bolts 88 that the foot portion 48 of outer sleeve 40 be present in order to serve as a means to prevent the housing 66 and the primary seal ring 60 from being crushed by the downward force applied to the outer sleeve 40 by pressure collar 88. The tolerances must be exact in order to form the required primary seal 56 at juncture 64 between heat tube 14 and tube sheet 16, yet at the same time, providing the necessary allowance so that when the heat tubes 14 expand vertically due to intense heat, they are free to move relative to the stationary tube sheet 16, without damaging the heat tube 14 and tube sheet 16, and without losing the primary seal 56 formed by the sealing system 10.

The following table lists the part numbers and part descriptions as used herein and in the drawings attached hereto.

| PARTS LIST | |
|---|---|
| PART | PART NO. |
| sealing system | 10 |
| heat tube | 14 |
| tube sheet | 16 |
| upper face | 17 |
| annular wall portion | 18 |
| lower end opening | 20 |
| upper end opening | 22 |
| internal space | 24 |
| area | 28 |
| outer sleeve means | 40 |
| vertical wall portion | 42 |
| upper face | 43 |
| lower portion | 44 |
| shoulder | 45 |
| inner face | 46 |
| annular space | 47 |
| foot portion | 48 |
| space | 50 |
| packing material | 52 |
| secondary sealing means | 54 |
| primary sealing means | 56 |
| resilient ring means | 58 |
| primary ring | 60 |
| spirals | 62 |
| juncture | 64 |
| metal housing | 66 |
| outer surface | 67 |
| sidewall | 68 |
| inner surface | 69 |
| terminating points | 70, 72 |
| opening | 74 |
| upper ring | 80 |
| first lower face | 82 |
| lower foot | 84 |
| upper face | 86 |
| pressure collar | 87 |
| bolt members | 88 |
| shoulder portion | 89 |
| arrow | 90 |
| lower ends | 91 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A sealing system for heat exchangers of the type having a plurality of heat tubes extending through a heat tube sheet for exchanging heat between the interior of the plurality of heat tubes to the surrounding area, the sealing system comprising:

a) a heat tube sheet;

b) a plurality of heat tubes extending through openings in said heat tube sheet, each heat tube having a bore through which materials flow for exchanging heat between the heat tube and the surrounding area;

c) each heat tube having an outer sleeve having a wall portion spaced apart from the heat tube wall and a lower foot portion, and defining an annular space between the foot portion of the outer sleeve and the heat tube and tube sheet;

d) resilient metallic ring means, positioned within the annular space surrounding the heat tube and supported by the tube sheet;

e) means for applying sufficient force on the outer sleeve, to force the resilient ring means into a primary sealing relationship with the heat tube and the tube sheet but to allow non-static expansion of the heat tube; and f) the outer sleeve further comprising means to prevent the resilient ring means from being crushed by the applied force.

2. The system in claim 1, wherein the resilient ring means further comprises an outer casing partially housing a soft metal primary ring.

3. The system in claim 1, further comprising a secondary seal of packing material positioned between the outer sleeve and the wall of the heat tube.

4. The system in claim 1, further comprising an upper ring positioned on the outer sleeve for receiving the applied force and imparting that force to the outer sleeve.

5. The system in claim 1, further comprising a pressure collar for applying force on the upper ring and outer sleeve to effect primary and secondary seals to the system.

6. The system in claim 1, wherein the space between the outer sleeve and the heat tube is formed by an inwardly-directed shoulder extending from the outer sleeve but not making contact with the wall of the heat tube.

7. The system in claim 1, wherein the resilient metallic ring means is comprised of a soft metal gold overlay stainless steel encasing a high nickel steel.

8. The system in claim 3, wherein the secondary sealing packing material is graphite packing.

9. The system in claim 5, wherein the outer sleeve is forced by a series of bolts in the pressure collar and threaded into the tube sheet.

10. A sealing system for sealing between a heat tube and tube sheet in heat exchangers of the type having a plurality of heat tubes, each circular in cross-section, and extending through a heat tube sheet for exchanging heat from the interior of the plurality of heat tubes to the surrounding area, the sealing system comprising:

a) a heat tube sheet;

b) a plurality of heat tubes extending through an opening in said heat tube sheet, each tube having a bore through which materials flow for exchanging heat between the heat tube and the surrounding area;

c) each heat tube having a first outer sleeve having a wall portion, terminating in an upper face, and further comprising a lower foot portion, the foot portion spaced apart from the heat tube wall, and defining an annular space between the foot portion of the outer ring at a juncture of the heat tube and tube sheet;

d) a soft metal inner ring, encircling the heat tube within the annular space surrounding the heat tube and resting on the tube sheet;

e) an outer casing partially housing the soft metal inner ring within the annular space; and f) means for imparting sufficient force on the first outer sleeve, to force the soft metal ring and outer casing into a primary sealing relationship between the heat tube and the tube sheet yet allowing non-static expansion and contraction of the heat tube; and g) the foot member defining a means for preventing the soft metal ring and outer housing to be crushed by the applied force.

11. The system in claim 10, further comprising a secondary seal of graphite packing material positioned between the first outer sleeve and the wall of the heat tube.

12. The system in claim 10, further comprising an upper ring positioned on the first outer sleeve for receiving the applied force and imparting that force to the first outer sleeve.

13. The system in claim 10, wherein the space between the first outer sleeve and the heat tube is formed by an inwardly-directed shoulder extending from the first outer sleeve but not making contact with the wall of the heat tube.

14. The system in claim 10, wherein the inner ring is comprised of a high-nickel steel encased in a soft metal gold overlay stainless steel.

15. The system in claim 10, wherein the packing material forms a secondary seal with the wall of the heat tube when the force is applied to the upper sleeve.

16. The system in claim 10, further comprising a pressure collar for applying force on the upper ring and outer sleeve to effect primary seals to the system.

17. The system in claim 16, wherein the force imparted to the upper ring and outer sleeve is through a series of bolts tightened between the pressure collar and the tube sheet.

18. A sealing system for heat exchangers, comprising:
 a) at least one vertically positioned heat tube, said heat tube circular in cross-section and having a heat-exchange flow space therethrough;
 b) tube sheet means supporting the passage of said heat tube therethrough and forming a juncture therebetween;
 c) a first outer sleeve positioned around said heat tube having a wall portion terminating in an upper face, and further comprising a lower foot portion, the foot portion spaced apart from the heat tube wall, and defining an annular space between the foot portion of the outer sleeve at said juncture of the heat tube and tube sheet;
 d) primary sealing means, further comprising:
  i) a high nickel inner ring, encircling the heat tube within the annular space formed by the foot portion and surrounding the heat tube; and
  ii) an outer casing of soft metal partially housing the high nickel inner ring within the annular space;
 e) means for imparting a force on the first outer sleeve sufficiently to force the high nickel ring and soft metal outer housing into a primary sealing relationship between the heat tube and the tube sheet, at the point of said juncture, while allowing for non-static expansion and contraction of the heat tube; and
 f) said foot portion preventing the high nickel ring and soft metal outer housing from being crushed by the applied force.

19. The system in claim 18, wherein the inner ring is comprised of high-nickel steel and the outer housing is made up of gold overlaid stainless steel.

20. A heat exchanger with an improved sealing system comprising:
 a) a heat exchanger vessel body that includes a heat tube sheet having a plurality of openings;
 b) a plurality of heat tubes that communicate with the tube sheet at the openings;
 c) each of the heat tubes having a bore through which materials flow for exchanging heat between the heat tube and the surrounding area;
 d) each heat tube having an outer sleeve having a wall portion spaced apart from the heat tube wall and a lower foot portion, and defining an annular space between the foot portion of the outer sleeve and the heat tube and tube sheet;
 e) resilient metallic ring means, positioned within the annular space surrounding the heat tube and supported by the tube sheet;
 f) means for applying sufficient force on the outer sleeve, to force the resilient ring means into a primary sealing relationship with the heat tube and the tube sheet but to allow non-static expansion and contraction of the heat tube; and
 g) the outer sleeve further comprising means to prevent the resilient ring means from being crushed by the applied force.

* * * * *